March 14, 1939.   J. G. JACKSON   2,150,623
MULTIPLE UNIT HEARTH BREAD BAKING PAN
Original Filed Feb. 11, 1937   2 Sheets-Sheet 1
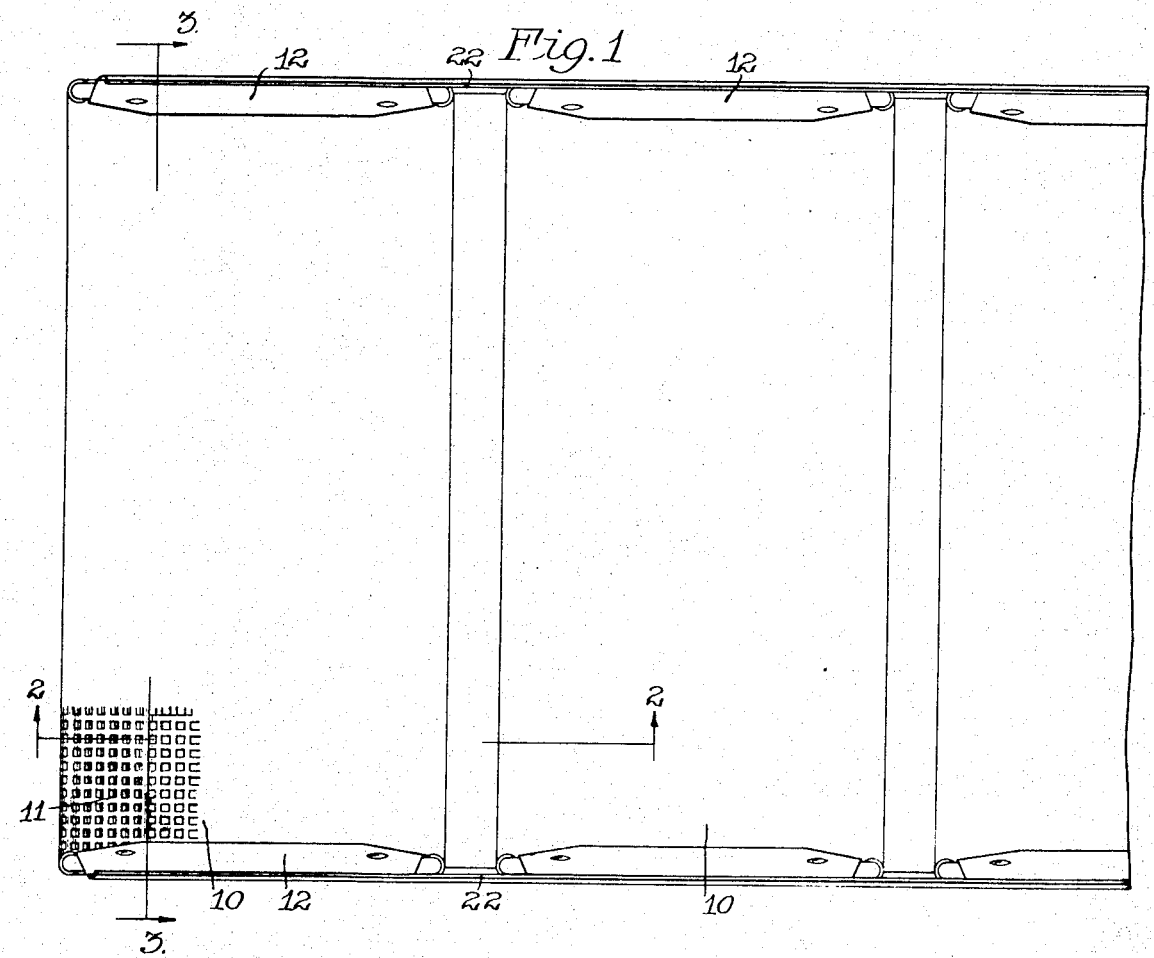
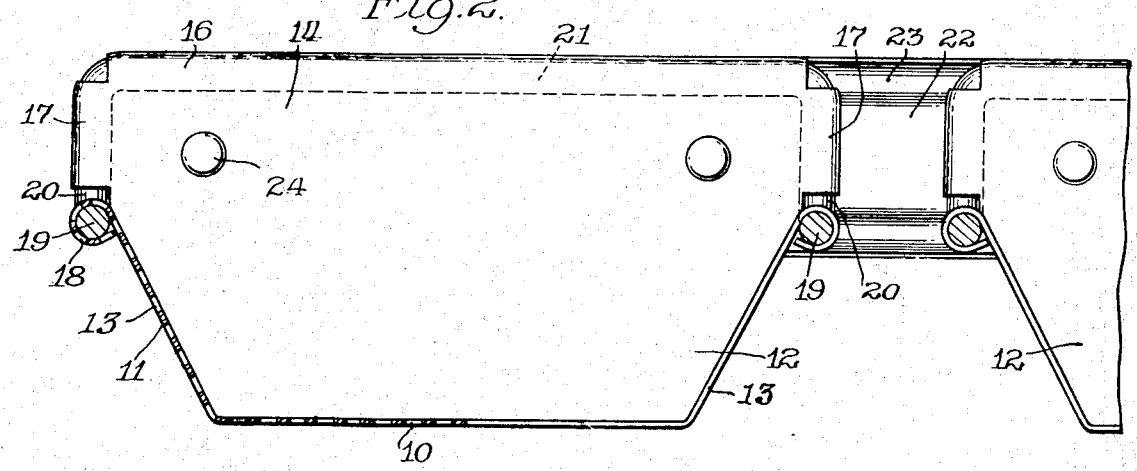
Inventor
Joseph G. Jackson
By Stanley Woods
Att'y

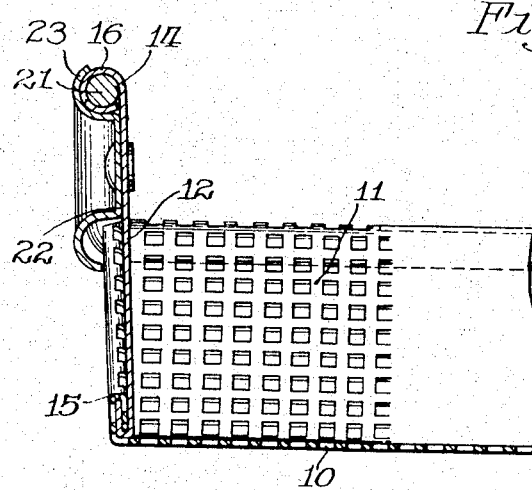
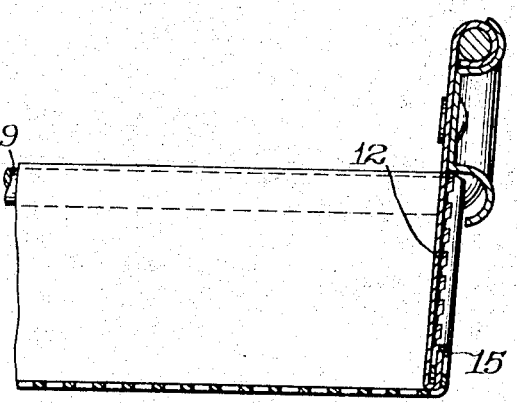
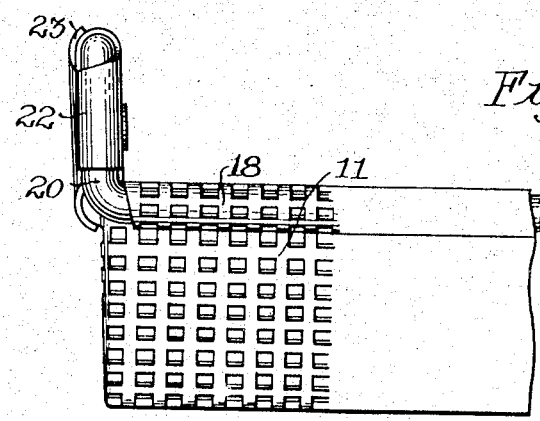
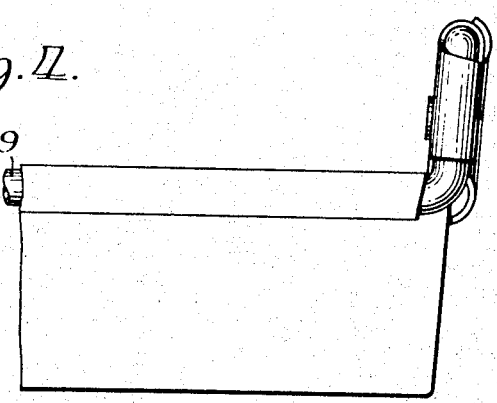
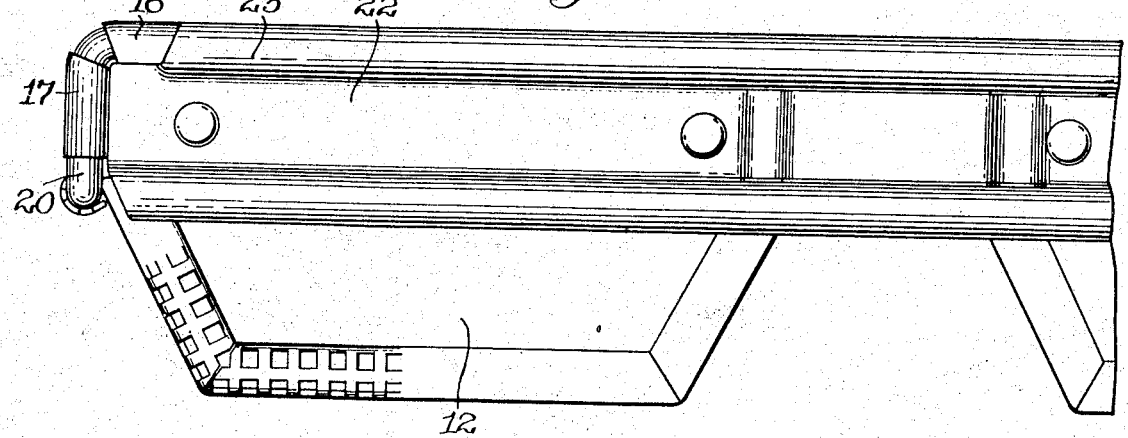

Patented Mar. 14, 1939

2,150,623

UNITED STATES PATENT OFFICE 2,150,623

MULTIPLE UNIT HEARTH BREAD BAKING PAN

Joseph G. Jackson, Oak Park, Ill., assignor to The Edward Katzinger Company, Chicago, Ill., a corporation of Illinois Application February 11, 1937, Serial No. 125,244
Renewed March 21, 1938

12 Claims. (Cl. 53—6)

This invention relates primarily to baking pans for the production of crusted bread commonly known as hearth bread, and the combining of several of these pans into a multiple unit baking pan set, that can be handled and manipulated as a complete individual unit.

The present invention has for its object the construction of a pan having minimum wall space whereby the heated air of the oven may circulate about and contact intimately with the surface of the loaf within the pan and at the same time create a construction which is strong, durable and inexpensive.

Among its objects, the present invention has in view the combining of several of the individual pans forming the subject matter of this invention into a multiple pan unit in such manner that the free circulation of the heated air of the oven is uninterfered with and without detracting from the strength and durabiliy of the set as a whole.

With the above objects in view, as will be apparent, this invention consists in the construction, combination and arrangement of parts, all as hereinafter more fully described, claimed and illustrated in the accompanying drawings, wherein:

Fig. 1 is a fragmentary plan view of a pan set made in accordance with the present invention and embodying several of the individual pans forming a part of the present invention;

Fig. 2 is a longitudinal section taken along line 2—2 of Fig. 1;

Fig. 3 is a longitudinal section taken through one of the individual pans along line 3—3 of Fig. 1;

Fig. 4 is an end elevation of the pan set showing the relationship between the end walls of the pan and the side walls thereof; and Fig. 5 is a fragmentary side elevation of the pan set.

Heretofore it has been well known to combine baking pans into a multiple unit set, whereby several loaves may be simultaneously baked and manipulated thereby eliminating the necessity of individually handling each loaf in placing it in the oven and removing it from the oven. Hearth bread, or crust bread originally was baked upon the floor or hearth of the oven so that all surfaces of the loaf were contacted by the heated air of the oven, thereby producing a substantial crust on the loaf. This not being particularly sanitary, the development of the art produced pans in sets and individually which had foraminated side walls through which the heated air of the oven could contact the sides or surfaces of the loaf within the pan.

The present invention contemplates a pan having foraminated sides and bottom, but which will have a minimum wall space for the confining and defining of the loaf and at the same time will provide substantial end walls for the pan whereby a number of the individual pans may be secured together into a multiple unit set and at the same time possess substantially all of the strength, durability of solid, full-walled pans.

Reference being had more particularly to the drawings 10 designates the foraminated bottom of an individual pan having a relatively narrow foraminated side wall 11, integral with the longitudinal edges of the bottom of 10. Solid metallic end walls 12 are provided at the opposite ends of the bottom 10. The lower side edges 13 of each end wall 12 slope outwardly and upwardly from the junction between the bottom and the end wall 12 to a point corresponding to or aligned with the outer edges of the side walls 11 in the completed pan. Above the sloping edges 13 of the end wall 12, each end wall is provided with an extension 14. The outer ends or extremities of the side walls 11 and the corresponding ends of the bottom 10 of the pan are provided with corner laps 15.

In assembling the pan, the side walls 11 are positioned angularly to the bottom 10 so that the extremities thereof rest against the sloping edges 13 of the end walls 12 of the pan when said end walls are positioned at substantially right angles to the bottom 10. When the walls 11—12 of the pan are thus angularly situated with respect to the bottom 10, the corner laps 15 at the extremities of the side walls 11 and the corner lap between the bottom 10 and end wall 12 are bent to rest flush against the outer surfaces of the solid metal end walls 12. Thus a relatively shallow pan is produced having the side walls 11 thereof foraminated and angularly disposed to the foraminated bottom 10. The end walls 12 of the pan are positioned between the extremities of the side walls 11 and the extensions 14 thereof project above the outer limits of said side walls.

Flanges 16 are provided at the upper edges of the end walls 12 while similar flanges 17 are provided at the edges of the extensions 14 aligned vertically with the outer extremities of the side walls 11. Also, the side walls 11 are provided with the flanges 18. These flanges 16, 17 and 18 are provided for engagement with a wire reinforcing frame which lies against the exposed outer surfaces of the side walls 11, the extensions 14 and the vertical edges of the extensions 14 of the end walls 12 adjoining the said flanges. This continuous wire frame comprises the parallel side members 19 which lie against the exposed outer surfaces of the side walls 11 adjoining flanges 18 thereof which are bent outwardly, downwardly and inwardly to wrap and engage said parallel frame members 19. At their extremities the frame members 19 are provided with substantially vertical uprights 20 integral with the side members 19 and positioned adjacent the end edges of the extensions 14 to be engaged by the flanges 17 thereof which are bent to surround and engage said uprights 20. Between each pair of corresponding uprights 20 is an end section 21 of the wire frame integral with the uprights 20 and lying against the outer face of the upper edge of extension 14 of the associated end wall 12 and engaged by the adjoining flange 16 on said extension.

From the foregoing it becomes manifest that the wire frame made up of the elements 19, 20 and 21 respectively engaged by the flanges 18, 17 and 16 creates outstanding beads at the edges of the side walls 11 and at all of the edges of the extensions 14 of the end walls 12 of the pan. Furthermore, it is evident that the wire frame composed of the elements 19, 20 and 21 is for all intents and purposes a solid construction which reinforces and strengthens the pan as a whole. It is also apparent that the extensions 14 of the end walls 12 of the pan project above the beaded edges of the side walls 11 of the pan, thereby providing a construction of ample strength, by which a number of the pans may be combined into a unit at the same time providing side wall of minimum width.

In order to combine a number of the pans above described into a set, the individual pans to be included in the set are placed side by side in said spaced parallel relation and a strap 22 is positioned against the exposed surfaces of the corresponding extensions 14 of the adjacent end walls 12. The upper edge of this strap is provided with integral channel 23 which is seated over and embraces the beads at the longitudinal edges of the extensions 14 of the co-acting walls 12, while the body of the strap 22 is super-imposed upon and covers the corner laps 15 lying against the end walls 12 and extensions 14 thereof. In order to secure the strap 22 in place as above described, a pair of rivets pierce the strap 22 and the extension 14 of said end wall 12 slightly inwardly of the limits of each upper corner of said extension 14 to be headed against the inner surface of said extension. Thus each strap is secured to each extension 14 of each co-acting end wall 12 at two points adjacent to the extremities of the extension 14 by the rivets.

The strap 22 cooperating with the corresponding ends of the individual pans of the set, by its securement to the extension 14 of each end wall 12, aids in maintaining the corner laps and extremities of the side walls 11 of each pan in intimate union with the end walls 12.

The present pan and set provides a means for baking multiple loaves of hearth or crusted bread in confined space whereby the heated air of the oven contacts freely with all surfaces of the loaf and a strong, durable and substantial set is produced.

What is claimed is:

1. A baking pan comprising a bottom, relatively narrow side walls secured to the edges of said bottom, end walls at the ends of said bottom provided with outwardly sloping edges against which bear the extremities of said side walls, corner laps at the extremities of the side walls fixed to the outer surfaces of the end walls, extensions on said end walls projecting above the limits of the side walls, flanges on said extensions and on said side walls, and a continuous frame positioned against the outer surface of said extensions and side walls to be engaged by the flanges aforesaid.

2. The combination with a plurality of baking pans each having a bottom and relatively narrow side walls and end walls interposed between the extremities of said side walls, of extensions on said end walls projecting above the limits of the side walls aforesaid, and straps connecting associated pans one to the other and co-operating with said extensions.

3. The combination with a plurality of baking pans, each having a bottom and relatively narrow side walls and end walls interposed between the extremities of said side walls, of extensions on said end walls projecting above the limits of the side walls aforesaid, said pans being arranged in spaced parallel relation with corresponding end walls aligned one with the other, and a strap positioned against the exposed surfaces of corresponding extensions and secured thereto.

4. A baking pan comprising a bottom, relatively narrow side walls, end walls, extensions on said end walls projecting above the edges of said side walls, and a continuous frame co-acting with the edges of the side walls and of the extensions of the end walls.

5. A baking pan comprising a bottom, relatively narrow side walls, end walls, extensions on said end walls projecting above the edges of said side walls, a continuous frame formed to lie adjacent the edges of the side walls and of the extensions of the end walls, and means for securing said frame to said edges.

6. The combination with a plurality of spaced pans, the end walls of each projecting above the plane of the edges of the side walls thereof, of means associated with projecting portions of the end walls of all of the pans to combine said pans in a set.

7. The combination with a plurality of pans spaced one from the other with their end walls in alignment, of extensions on said end walls projecting above the limits of the side walls thereof, and means associated with the extensions of the end walls of all the pans for combining the pans in a set.

8. The combination with a plurality of pans spaced one from the other with their end walls in alignment, of extensions on said end walls projecting above the limits of the side walls thereof, and straps associated with and secured to said extensions of the end walls of all the pans to combine the pans in a set.

9. A baking pan comprising a foraminated bottom, relatively narrow side walls, end walls, extensions on said end walls projecting above the edges of said side walls, and a continuous frame coacting with the edges of the side walls and of the extensions of the end walls.

10. A baking pan comprising a bottom, relatively narrow foraminated side walls, end walls, extensions on said end walls projecting above the edges of said side walls, and a continuous frame coacting with the edges of the side walls and of the extensions of the end walls.

11. A baking pan comprising a bottom and relatively narrow side walls of foraminated material, end walls, extensions on said end walls projecting above the edges of said side walls, and a continuous frame coacting with the edges of the side walls and of the extensions of the end walls.

12. A baking pan comprising a bottom, relatively narrow side walls secured to the edges of said bottom, end walls at the ends of said bottom provided with outwardly sloping edges against which bear the extremities of said side walls, corner laps at the extremities of the side walls fixed to the outer surfaces of the end walls, extensions on said end walls projecting above the limits of the side walls, and means for reinforcing the upper edges of said side walls and end walls.

JOSEPH G. JACKSON.